United States Patent [19]
Hart

[11] Patent Number: 5,408,356
[45] Date of Patent: Apr. 18, 1995

[54] FIBER OPTIC SIGNAL AMPLIFIER USING THERMOELECTRIC POWER GENERATION

[75] Inventor: Mark M. Hart, Aiken, S.C.

[73] Assignee: The United States of America as represented by the United States Department of Energy, Washington, D.C.

[21] Appl. No.: 100,153

[22] Filed: Aug. 2, 1993

[51] Int. Cl.⁶ .......................... H02J 1/10; H01S 3/00
[52] U.S. Cl. ...................................... 359/341; 307/43
[58] Field of Search ................ 359/341, 345; 307/43, 307/44, 56, 64; 322/2 R; 310/306; 136/202, 208, 210

[56] References Cited

U.S. PATENT DOCUMENTS

| | | | |
|---|---|---|---|
| 3,615,869 | 10/1971 | Barker et al. | 136/202 |
| 3,663,306 | 5/1972 | Des Champs et al. | 136/202 |
| 3,840,431 | 10/1974 | Devin et al. | 176/39 |
| 4,020,368 | 4/1977 | Carney | 310/4 R |
| 4,651,019 | 3/1987 | Gilbert et al. | 307/43 |
| 5,054,876 | 10/1991 | Grasso et al. | 385/24 |
| 5,136,420 | 8/1992 | Inagaki et al. | 359/341 |
| 5,140,456 | 8/1992 | Huber | 359/341 |
| 5,170,447 | 12/1992 | Heideman | 385/24 |

OTHER PUBLICATIONS

"Newsfronts", *Lasers and Optronics*, Apr. 1991, p. 12.

*Primary Examiner*—Mark Hellner
*Attorney, Agent, or Firm*—Brian R. Tumm; Harold M. Dixon; William R. Moser

[57] ABSTRACT

A remote fiber optic signal amplifier for use as a repeater/amplifier, such as in transoceanic communications, powered by a $Pu_{238}$ or $Sr_{90}$ thermoelectric generator. The amplifier comprises a unit with connections on the receiving and sending sides of the communications system, and an erbium-doped fiber amplifier connecting each sending fiber to each receiving fiber. The thermoelectric generator, preferably a $Pu_{238}$ or $Sr_{90}$ thermoelectric generator delivers power to the amplifiers through a regulator. The heat exchange surfaces of the thermoelectric generator are made of materials resistant to corrosion and biological growth and are directly exposed to the outside, such as the ocean water in transoceanic communications.

11 Claims, 1 Drawing Sheet

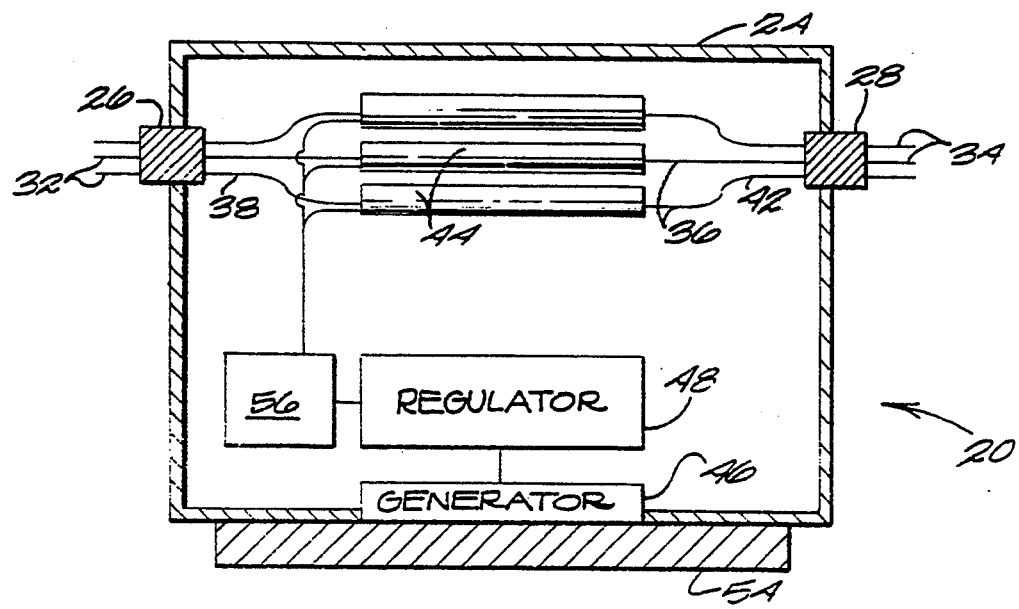
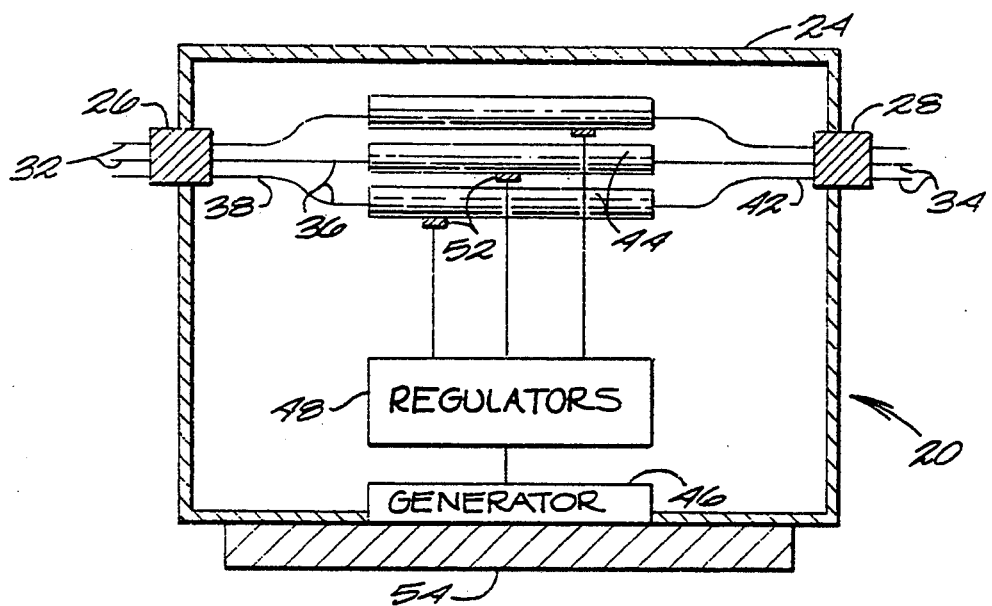

FIBER OPTIC SIGNAL AMPLIFIER USING THERMOELECTRIC POWER GENERATION

The United States Government has rights in this invention pursuant to Contract No. DE-AC09-89SR18035 between the U.S. Department of Energy and Westinghouse Savannah River Company.

BACKGROUND OF THE INVENTION

1. Field of the Invention

The present invention relates to fiber optic signal amplifiers and thermoelectric generators. More particularly, the present invention relates to a remote amplifier for optical fibers transmitting light signals that is powered by a thermoelectric generator.

2. Discussion of Background

In current optical fiber communication systems, optical amplifiers or amplifier/repeaters are included in transmission lines at periodic intervals to compensate for attenuation of the light signal. Currently, the most successful kind of optical amplifier involves pumping light with an optical fiber doped with a rare-earth element, such as erbium.

Erbium-doped amplifiers are made by doping a segment of the fiber with erbium and then exciting the erbium atoms to a high energy level through the introduction of pumping light. The energy is transferred gradually to signal light passing through the fiber segment during excitation, resulting in an amplification of the signal light upon exit from the amplifier.

Erbium-doped amplifiers are known for use with optical fibers. U.S. Pat. Nos. 5,136,420, issued to Inagaki et al, and 5,140,456, issued to Huber, both disclose erbium-doped amplifier for use with optical fibers. Inagaki et al (U.S. Pat. No. 5,136,420) disclose reflective films and fiber loops that allow the amplifier to utilize pumping light more efficiently. Huber discloses an amplifier whereby pumping light has two wavelengths, one for low noise and the other for high power efficiency.

Also of interest and relating to optical fiber amplifiers are the apparatus described in U.S. Patents issued to Heidemann (U.S. Pat. No. 5,170,447) and Grasso et al (U.S. Pat. No. 5,054,876). Heidemann discloses coupling and transmission of more than one light signal and Grass et al disclose an optical fiber amplifier with reduced noise.

Like optical fiber amplifiers, thermoelectric generators are known in the prior art. In general, thermoelectric generation involves a heat source applied to a thermoelectric converter, which is typically two dissimilar materials with different thermal conductivities. With the addition of a heat sink, a thermal gradient is established across the two materials, causing an electric potential difference to be established across the two materials.

Several U.S. Patents disclose various aspects of thermoelectric generators. For instance, in U.S. Pat. No. 4,020,368, Carney describes a thermoelectric generator using a nuclear heat source in combination with a thermoelectric converter. Also, U.S. Pat. No. 3,840,431, issued to Devin et al, discloses a submarine nuclear reactor and the use of thermionic diodes to convert the nuclear energy to electrical power.

Other relevant U.S. Patents include U.S. Pat. No. 3,663,306, in which Des Champs et al disclose a housing for radioisotopic thermoelectric generators capable of withstanding high external pressures (such as at great depths in the ocean). Also, in U.S. Pat. No. 3,615,869, Barker et al disclose an assembly having improved remote replacement accessibility.

SUMMARY OF THE INVENTION

According to its major aspects and broadly stated, the present invention is a remote fiber optic amplifier powered by a thermoelectric generator. In particular, it is a fiber optic signal amplifier or repeater/amplifier, as used in transoceanic communications, powered by a $Pu_{238}$-based or $Sr_{90}$-based thermoelectric generator. The amplifier comprises a unit with connections on the receiving and sending sides of the communications system, and an erbium-doped fiber amplifier connecting each sending fiber to each receiving fiber. The thermoelectric generator, preferably a $Pu_{238}$-based or $Sr_{90}$-based thermoelectric generator, provides power to the amplifiers through a regulator. The thermoelectric generator has external heat exchange surfaces exposed to the environment, such as the ocean floor, that are made of materials resistant to corrosion and biological growth.

A major feature of the present invention is the combination of a self-contained, self-supporting power source and a remotely located fiber optic amplifier. Preferably, the electrical power needed to operate the optical amplifier is a thermoelectric generator. The source of heat for the thermoelectric generator is ideally the radioactive decay heat from a radioisotope. The advantage of this feature is that additional power cables do not have to be run to each fiber optic amplifier location, thus eliminating unnecessary bulk, weight, cost and the associated magnetic fields.

Another feature of the present invention is the choice of a $Pu_{238}$-based or $Sr_{90}$-based thermoelectric generator to provide operational power for the amplifier. A $Pu_{238}$ or $Sr_{90}$ thermoelectric generator uses decay heat from $Pu_{238}$ or $Sr_{90}$ as a source of heat for conversion to electric power. $Pu_{238}$ and $Sr_{90}$ are long-lived radioisotopes and each produces a relatively steady supply of heat for the thermoelectric generator. This feature increases the useful life of the amplifier because of the longevity and reliability of $Pu_{238}$ and $Sr_{90}$ thermoelectric generators.

Still another feature is the choice of erbium-doped fiber amplifiers. Erbium-doped amplifiers have a higher degree of reliability than many other types of optical fiber amplifiers, thus they do not have to be replaced or repaired as often. This feature significantly reduces the need for repair of the amplifier/repeater unit, thereby reducing the costly and time-consuming retrieval of cables from remote locations for such repairs. Also, the cost of manufacture and initial set-ups will be greatly reduced as a result of using erbium-doped fiber amplifiers. Clearly, if a more efficient dopant than erbium is discovered for use in amplifiers for optical fiber communications, then it would be an obvious extension of the present invention to use the more effective dopant.

Yet another feature is the regulation of electric power provided by the thermoelectric generator to the fiber optic amplifier/repeater. The regulator drops the voltage of the generator to one usable by the amplifier and maintains that voltage. Most amplifiers, especially those used for highly sensitive optical fiber systems, contain delicate electrical components that are gradually destroyed by an uneven supply of power and are especially susceptible to voltage spikes. The use of voltage regulators between the generator and the amplifier transforms, maintains and regulates the voltage level from the thermoelectric generator to the optical fiber amplifier/repeater unit, thus reducing the possibility of damage to the sensitive electrical components contained within the amplifier/repeater unit and providing a satisfactory voltage that can be used by the optical fiber amplifier/repeater unit.

Other features and advantages of the present invention will be apparent to those skilled in the art from a careful reading of the Detailed Description of a Preferred Embodiment presented below and accompanied by the drawings.

BRIEF DESCRIPTION OF THE DRAWINGS

In the drawings,

FIG. 1 is a schematic view of a fiber optic amplifier according to a preferred embodiment of the present invention; and FIG. 2 is a schematic view of the fiber optic amplifier of FIG. 1 according to an alternative embodiment.

DETAILED DESCRIPTION OF A PREFERRED EMBODIMENT

In the following description similar components are referred to by the same reference numeral in order to simplify the understanding of the sequential aspect of the drawings.

Referring now to FIG. 1, the fiber optic amplifier/repeater 20 in its preferred embodiment includes a housing 24 carrying a first connector 26 and a second connector 28. First and second connectors 26, 28 allow amplifier/repeater 20 to be interposed between and connected to a first optical fiber bundle (shown generally as 32) and a corresponding second optical fiber bundle (shown generally as 34).

First optical fiber bundle 32 is adapted to carry light signals from, for example, an optical transmitter (not shown). Similarly, second optical fiber bundle 34 is adapted to carry light signals to, for example, an optical receiver (not shown).

Inside housing 24 is a plurality of optical fibers (indicated generally by reference numeral 36) with a first end 38 connected to first connector 26 and a second end 42 connected to second connector 28. Optical fibers 36 correspond in number to both first optical fiber bundle 32 and second optical fiber bundle 34 so that amplifier/repeater optically links each sending fiber of first optical fiber bundle 32 and a corresponding receiving fiber of second optical fiber bundle 34.

Attached to optical fibers 36 are corresponding optical amplifiers 44, preferably in the form of erbium-doped fiber segments. Optical amplifiers 44 can alternatively be in the form of laser diodes or other amplifying means in optical communication with optical fibers 36.

Electrical power is supplied to optical amplifiers 44 by a thermoelectric generator 46 using a heat source such as $Pu_{238}$, $Sr_{90}$ or other suitable material. Preferably, thermoelectric generator 46 is a $Pu_{238}$ thermoelectric generator whereby $Pu_{238}$ is used as the heat source or a $Sr_{90}$ thermoelectric generator whereby $Sr_{90}$ is used as the heat source. In this manner, thermoelectric generator 46 is a highly reliable, self-contained electrical power supply that requires no external wiring or support.

A regulator 48 is electrically connected to thermoelectric generator 46. Preferably, regulator 48 comprises a plurality of voltage regulators. Regulator 48 is connected to optical amplifiers 44 through an appropriate connecting adapter 52. In FIG. 1, regulators 48 are configured to transform, maintain and limit the voltage supplied to optical amplifiers 44 from thermoelectric generator 46 to a level that can be used by optical amplifiers 44. Typically, generator 46 would be designed to produce a voltage in excess of that needed for amplifier 44, perhaps by a factor of three, to allow for variations in heat sink temperature and voltage die-off the $Pu_{238}$ or $Sr_{90}$. This voltage needs to be reduced or limited to that required for operation of the amplifier and regulated so that it is steady notwithstanding power surges into regulator 48.

Regulator 48 might for example comprise a solid state chopping circuit that provides a square wave output. Ripple in the regulator's square wave output would be smoothed by a capacitor bank. The regulator provides feedback about the level of the output voltage to modify the duty cycle of its square wave output. By varying the duty cycle of the square wave, the regulator output can be increased and decreased.

Thermoelectric generator 46 has a heat exchange surface 54 for establishing a temperature gradient within thermoelectric generator 46. Preferably, heat exchange surface 54, which may comprise a plurality of fins, is exposed directly to the environment outside of unit 24, for example to ocean water in the case of transoceanic communications systems. Heat exchange surface 54 should be in thermal communication, by direct or indirect contact, with other heat-generating components of the present invention, such as regulators 48 and optical amplifiers 44.

In FIG. 2, repeater/amplifier 20 has a slightly different configuration than previously described. In housing 24, optical amplifiers 44 comprise a plurality of erbium-doped segments of optical fibers 36. As such, optical amplifiers 44 use pumping light for exciting erbium atoms in the doped segments for proper operation of optical amplifiers 44. Thus, a pumping light source 56 is optically connected with optical amplifiers 44.

Pumping light source 56 is preferably a plurality of light emitting diodes or, alternatively, laser diodes. Pumping light source 56 is in electrical connection with and powered by thermoelectric generator 46 through voltage regulator 48, as described previously.

In use, repeater/amplifier 20 is preferably one of a number of repeater/amplifiers interposed between a plurality of optical cables carrying fibers such as fibers 32, 34, that together form a fiber optic communications system. Such systems may be used, for example, as a transoceanic fiber optic communications, or for fiber optic transmission across other large, remote areas. Preferably, unit 24 is installed initially when the communications system is being set-up.

As previously stated, unit 24 is completely self-supporting with respect to providing electrical power for operating optical amplifiers 44. That is, thermoelectric generator 46, preferably a $Pu_{238}$ or $Sr_{90}$ thermoelectric generator, converts heat from its heat source to electrical power for use in operating optical amplifiers 44 and does not depend on an external source of electrical power transmitted through electrical cabling. Voltage regulator 48 maintains a constant level of electrical power from thermoelectric generator 46 for use by pumping light source 56.

Light signals carried by first optical fiber bundle 32 enter housing 24 through first connector 26. Preferably, with optical amplifiers 44 being erbium-doped segments of optical fiber excited with pumping light from source 56, light signals entering optical amplifiers 44 accumulate energy while passing through the erbium-doped segments.

Light signals exiting optical amplifiers 44, having been amplified, pass from housing 24 through second connector 28, where they are received by second optical fiber bundle 34 and transmitted further along the fiber optic communications system.

It will be apparent to those skilled in the art that many changes and substitutions can be made to the preferred embodiment herein described without departing from the spirit and scope of the present invention as defined by the appended claims.

What is claimed is:

1. Apparatus for use with a first conductor carrying a signal having an amplitude and with a second conductor, said apparatus comprising:
   a housing;
   a first connector carried by said housing and connected to said first conductor;
   a second connector carded by said housing and connected to said second conductor;
   a source of heat from the decay of a radioisotope within said housing;
   means within said housing and in thermal communication with said source for converting said heat to an electrical potential difference; and
   means for amplifying signals, said amplifying means in electrical communication with said converting means and connected to said first and said second connectors so that said amplifying means receives said signal, amplifies said signal with said electrical potential difference, and passes said amplified signal to said second connector.

2. The apparatus as recited in claim 1, wherein said signal is a light signal, said first and second conducting means are both optical fibers and said amplifying means is an optical amplifier.

3. The apparatus as recited in claim 1, wherein said amplifying means is an erbium-doped optical amplifier.

4. The apparatus as recited in claim 1, wherein said amplifying means is an erbium-doped optical amplifier and said source of heat is radioactive decay from a radioisotope.

5. The apparatus as recited in claim 1, further comprising means in electrical connection with said amplifying means for regulating said electrical potential difference.

6. The apparatus as recited in claim 1, wherein said source of heat produces excess heat, and said apparatus further comprises means for dissipating said excess heat, said dissipating means carried outside said housing.

7. Fiber optic communication system for transmitting an optical signal from a transmitter to a receiver, said system comprising:
   a plurality of fiber optic cables; and
   a plurality of optical amplifiers, each optical amplifier connecting two of said plurality of optic cables and amplifying said signal from each preceding fiber optic cable and passing said amplified signal to a subsequent fiber optic cable, each optical amplifier having
      a source of heat from radioactive decay of a radioisotope selected from the group consisting of $Pu_{238}$ and $Sr_{90}$,
      means for converting said heat to electricity, and
      means for amplifying said signal using said electricity.

8. The apparatus as recited in claim 7, wherein said amplifying mean further comprises an erbium-doped optical fiber amplifier.

9. The apparatus as recited in claim 7, wherein said amplifier is an erbium-doped optical fiber amplifier and said source of heat is radioactive decay from a radioisotope.

10. The apparatus as recited in claim 7, wherein said amplifier is an erbium-doped optical fiber amplifier and said source of heat is radioactive decay from the group consisting of $Pu_{238}$ and $Sr_{90}$.

11. The apparatus as recited in claim 7, wherein said source produces excess heat and said optical amplifier further comprises means for dissipating said excess heat.

* * * * *